United States Patent [19]

Sonoda et al.

[11] Patent Number: 5,878,175
[45] Date of Patent: Mar. 2, 1999

[54] ELECTRO-OPTICAL WAVEGUIDE ELEMENT WITH REDUCED DC DRIFT PHENOMENA

[75] Inventors: Shinichiro Sonoda; Masami Hatori, both of Kanagawa-ken, Japan

[73] Assignee: Fuji Photo Film Co., Ltd., Kanagawa-ken, Japan

[21] Appl. No.: 701,055

[22] Filed: Aug. 21, 1996

Related U.S. Application Data

[63] Continuation of Ser. No. 413,900, Mar. 30, 1995, abandoned.

[30] Foreign Application Priority Data

Apr. 15, 1994 [JP] Japan ................................ 6-077633

[51] Int. Cl.$^6$ ............................ G02F 1/035; G02F 1/295
[52] U.S. Cl. .................................... 385/2; 385/8; 385/10
[58] Field of Search .................. 385/2, 4, 8, 10, 385/37, 42

[56] References Cited

U.S. PATENT DOCUMENTS

| | | | |
|---|---|---|---|
| 3,904,270 | 9/1975 | Cheo | 385/37 |
| 4,076,381 | 2/1978 | Hammer | 385/37 |
| 4,775,208 | 10/1988 | Robinson et al. | 385/40 |
| 5,185,829 | 2/1993 | Yamada et al. | 385/37 |
| 5,214,723 | 5/1993 | Zamkotsian | 385/2 |
| 5,214,724 | 5/1993 | Seino et al. | 385/2 |
| 5,317,666 | 5/1994 | Agostinelli et al. | 385/122 |
| 5,404,412 | 4/1995 | Scino et al. | 385/2 |
| 5,526,448 | 6/1996 | Nagata et al. | 385/2 |
| 5,566,258 | 10/1996 | Hatori et al. | 385/8 |

FOREIGN PATENT DOCUMENTS 2-931  1/1990  Japan ........................... G02F 1/335

OTHER PUBLICATIONS

*Japanese Journal of Applied Physics*, "DC Drift Phenomena in LiNbO3 Optical Waveguide Devices", Apr. 1981, pp. 733–737.

*Primary Examiner*—Hemang Sanghavi
*Attorney, Agent, or Firm*—Sughrue, Mion, Zinn, Macpeak & Seas, PLLC

[57] ABSTRACT

An electro-optical waveguide element with reduced DC drift phenomena is presented. The waveguide element is made up of an optical waveguide formed on a substrate possessing electro-optical effects, at least a pair of electrodes closely attached to the optical waveguide with a buffer layer sandwiched between the substrate and the electrodes, and a driver circuit for applying a voltage between the electrodes. The buffer layer is made of a material having a dielectric constant in the range of 20–1000. The buffer layer is more preferably made of a material having a dielectric constant in the range of 20–200. The material of the buffer layer is selected from the group consisting of $HfO_2$, $TiO_2$, $SrTiO_3$, $BaTiO_3$, $LiNbO_3$, $LiTaO_3$, $Pb(Zr, Ti)O_3$, and $(Pb, La)(Zr, Ti)O_3$.

2 Claims, 6 Drawing Sheets

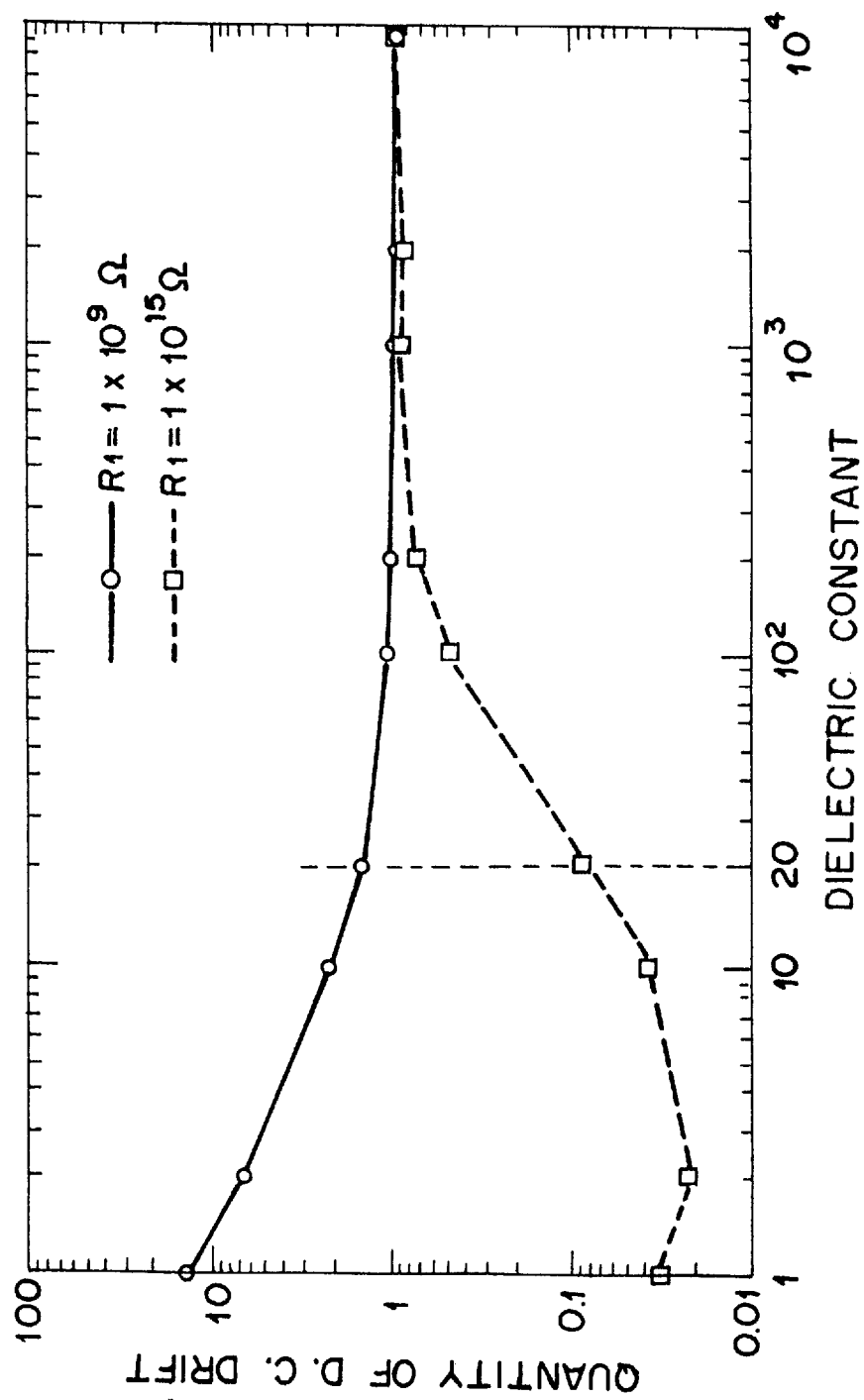

ELECTRO-OPTICAL WAVEGUIDE ELEMENT WITH REDUCED DC DRIFT PHENOMENA

This is a Continuation of application Ser. No. 08/413,900 filed Mar. 30, 1995, now abandoned.

BACKGROUND OF THE INVENTION

1. Field of the Invention

This invention relates to an electro-optical waveguide element provided with an optical waveguide, formed on a substrate having electro-optical effects, and at least a pair of electrodes positioned adjacent to this optical-waveguide, in which the modulation or switching of guided light is carried out by applying a voltage between the electrodes.

2. Description of the Prior Art

As is disclosed in, for example, Japanese Unexamined Patent Publication No. Hei-2(1990)-931, an electro-optical waveguide element has already been known which comprises a thin-film optical waveguide formed on a substrate having electro-optical effects, a grating-shaped electrode (hereinafter referred to as an EOG electrode) that forms electro-optical diffraction gratings in the optical waveguide, and a driver circuit for applying a voltage to this EOG electrode. In this electro-optical waveguide, guided light which travels through the optical waveguide is selectively diffracted in accordance with a state of application of the voltage to the EOG electrode.

The use of such an electro-optical waveguide element makes it possible to modulate light to be used in response to the presence or absence of diffraction or the degree of diffraction when either diffracted light or non-diffracted light (zero-order light) is used. In addition, an optical switch can be constituted which switches an optical path of guided light in response to the presence or absence of diffraction.

Moreover, as is disclosed in, for example, JAPANESE JOURNAL OF APPLIED PHYSICS, Vol. 20, No. 4, April, 1981, pp. 733–pp. 737, an electro-optical waveguide element is also known. This electro-optical waveguide element is made up of two optical channel waveguides, formed on a substrate having electro-optical effects, that constitute a directional coupler, and a planar electrode provided on each optical channel waveguide. Guided light that travels through either one of the optical channel waveguides is selectively shifted to the other optical channel waveguide in response to the state of the application of a voltage to the planar electrode.

The use of such an electro-optical waveguide element makes it possible to use the light emitted from the other optical channel waveguide, and to modulate the light in response to the state of application of a voltage to the electrode. Further, an optical switch can be constituted which switches an optical path of guided light.

In the electro-optical waveguide elements set forth above, it is necessary to form an optical buffer layer between the electrode and the substrate in order to prevent the scattering or absorption of light caused by the electrode. This buffer layer has been conventionally formed of $SiO_2$ or $Al_2O_3$.

It is acknowledged that the electro-optical waveguide element having the previously mentioned buffer layer is susceptible to so-called DC drift phenomena, i.e. the phenomena in which an operating point varies with the application of a voltage.

To prevent such DC drift phenomena, as is disclosed in the previously mentioned JAPANESE JOURNAL OF APPLIED PHYSICS, Vol. 20, No. 4, April, 1981, pp. 733–pp. 737, a proposal is conventionally put forward in which an area between the buffer layer and the electrode is removed, and the buffer layer is separated for each electrode.

However, if input light has a short wavelength or a high intensity, a leakage current occurring in the optical waveguide will become larger, and therefore it is impossible to sufficiently reduce the extent of the DC drift, even by separating the buffer layer for each electrode in the manner as previously mentioned.

SUMMARY OF THE INVENTION

The present invention is made in view of the observations set forth above, and the primary object of this invention is to provide an electro-optical waveguide element capable of sufficiently reducing DC drift even if input light has a short wavelength or high intensity.

To achieve this object, according to one aspect of the present invention, there is provided an electro-optical waveguide element comprising:

an optical waveguide formed on a substrate having electro-optical effects;

at least a pair of electrodes attached adjacent to the optical waveguide with a buffer layer sandwiched between the substrate and the electrodes; and a driver circuit for applying a voltage between the electrodes, wherein the buffer layer is made of material having a dielectric constant in the range of 20–1000 which is sufficiently larger than a dielectric constant (not greater than 10) of a conventional buffer layer.

Specifically, it possible to appropriately use material, selected from the group composed of $HfO_2$, $TiO_2$, $SrTiO_3$, $BaTiO_3$, $LiNbO_3$, $LiTaO_3$, Pb (Zr, Ti) $O_3$, (Pb, La) (Zr, Ti)$O_3$ or the like, as a material for such a buffer layer. It is also possible to use materials which are slightly different from the stoichiometric ratios of these materials.

As shown in FIG. 3, a thin-film optical waveguide 2 is formed on a substrate 1, and grating-shaped EOG electrodes 4 are formed on the optical waveguide 2 with a buffer layer 3 sandwiched between them. An equivalent circuit of this structure is shown in FIG. 4. $C_1$ and $R_1$ respectively represent the capacitance and resistance of the buffer layer 3, and $C_2$ and $R_2$ respectively represent the capacitance and resistance of the optical waveguide 2. Assuming that a voltage $V_0$ is applied between a pair of electrode pieces 4a and 4b of the EOG electrode 4, an effective voltage V applied to the optical waveguide 2 will be represented by a function of an application time "t" as shown below.

$$V = V_0\{A + (B-A)\exp^{-t/\tau}\} \qquad (1)$$

where, $A = R_2/(R_2 + 4R_1)$
$B = C_1/(C_1 + 4C_2)$
$\tau = R_1 R_2 (C_1 + 4C_2)/(R_2 + 4R_1)$ Specifically, the effective voltage V when the voltage $V_0$ is applied is B $V_0$, and this effective voltage V converges at A $V_0$ after sufficient time $\tau$ has elapsed. The previously described d.c. drift phenomena is attributable to variations in the effective voltage V applied to the optical waveguide 2 with the application time "t". All that is needed is to sufficiently increase $\tau$ or to sufficiently reduce a value obtained as a result of the subtraction of A from B.

In this invention, since the dielectric constant of the material of the buffer layer is larger than that of conventional material, the capacitance $C_1$ of the buffer layer 3 becomes larger. Assuming that resistance $R_1$ of the buffer layer 3 is the same, $\tau$ will become larger because the capacitance $C_1$ of the buffer layer 3 is large. Therefore, other than when the resistance $R_2$ of the optical waveguide 2 is considerably larger than the resistance $R_1$ of the buffer layer 3, namely, when the resistance $R_1$ of the buffer layer 3 is considerably smaller than the resistance $R_2$ of the optical waveguide 2, variations in the effective voltage V, i.e. DC drift, are suppressed by virtue of the fact that $\tau$ is sufficiently increased.

When the resistance $R_1$ of the buffer layer 3 is remarkably larger than the resistance $R_2$ of the optical waveguide 2, the capacitance $C_1$ of the buffer layer 3 will be sufficiently increased if the buffer layer 3 is formed of material having a large dielectric constant, and hence the value of B will approximate one. On the other hand, if the resistance $R_1$ of the buffer layer 3 is considerably larger than the resistance $R_2$ of the optical waveguide 2, the value of A will also approximate one. Accordingly, a value obtained as a result of the subtraction of A from B will become sufficiently small. Thus, variations in the effective voltage V applied to the optical waveguide 2 are suppressed to a small amount, and therefore the DC drift can be sufficiently reduced.

The operation and resulting effects of the electro-optical waveguide element according to this invention will be specifically explained. FIG. 5 shows that the amount of DC drift varies in response to the dielectric constants of the buffer layer 3 in the structure shown in FIG. 3 when several types of the buffer layer 3 are formed of materials having different dielectric constants. In this case, the thickness of the buffer layer 3 is 200 nm; a period A of the EOG electrodes 4 is 6.9 $\mu$m; and a distance L between the electrodes is 0.69 mm. The capacitance $C_2$ of the optical waveguide 2 is 0.16 pF, and the resistance $R_2$ of the optical waveguide 2 is $1\times10^{13}\Omega$. These values are obtained from the structure which is not provided with the buffer layer 3.

The amount of DC drift is normalized using the effective voltage V as one which is applied to the optical waveguide 2 when 1 nsec. has passed after the initial application of the voltage. The amount of DC drift is shown using the effective voltage V obtained when 10 sec. have passed after the initial application of the voltage. In other words, this value indicates the degree of multiplication of the effective voltage V until ten sec. pass from the initial one nsec. after the starting of the application of the voltage. A solid line in the drawing shows the fact that the resistance $R_1$ of the buffer layer 3 is relatively small compared with $1\times10^9\Omega$, whilst a broken line shows the fact that the resistance $R_1$ of the buffer layer 3 is relatively large compared with $1\times10^{15}\Omega$.

In the prior art, $SiO_2$ and $Al_2O_3$ are generally used as the material for this type of buffer layer. The dielectric constant of the former material is 4, and the dielectric constant of the latter material is 10. When a material having such a degree of dielectric constant is used as material for the buffer layer, the amount of resulting DC drift is considerably large.

Contrary to this, both when the resistance $R_1$ of the buffer layer is relatively low and when the same is relatively high, the amount of DC drift is remarkably reduced around a point at which the dielectric constant of the material for the buffer layer is more than 20. When the dielectric constant of the buffer layer material exceeds 1000, the amount of DC drift converges to one. Specifically, the value of the effective voltage V becomes stable even when 10 sec have passed after the starting of the application of the voltage.

There are circumstances in which it is difficult to produce a thin-film having a dielectric constant of more than 1000, and hence the maximum value of the dielectric constant is set to 1000 in the present invention. Moreover, both when the resistance $R_1$ of the buffer layer 3 is relatively low and when the same is relatively high, the effect of reducing DC drift is not substantially increased even if the dielectric constant is increased in excess of 200. In other words, a sufficient d.c. drift reducing effect is obtained so long as the dielectric constant reaches about 200. Thus, in terms of the facilitation of production of a thin film, it is desirable for the buffer layer to be formed of a material having a dielectric constant in the range of 20–200.

The above explanation is given of a structure in which the comb-shaped EOG electrodes staggered in relation to one another are formed on the thin-film optical waveguide via the buffer layer sandwiched between them. In the case of an electro-optical waveguide element in which a voltage is applied to an optical channel waveguide using planar electrodes, all that is required is the replacement of $4R_1$ and $4C_2$ in the equation (1) with $2R_1$ and $2C_2$. Even in this case, it becomes possible to sufficiently reduce DC drift in the manner as previously mentioned so long as the buffer layer is made of a material having a large dielectric constant.

BRIEF DESCRIPTION OF THE DRAWINGS

In the drawings:

FIG. 5 is a graph showing the relationship between a dielectric constant of material for a buffer layer and the amount of DC drift;

DESCRIPTION OF THE PREFERRED EMBODIMENTS

By reference to the accompanying drawings, the present invention will now be described in detail.

First Embodiment

Figure 1:
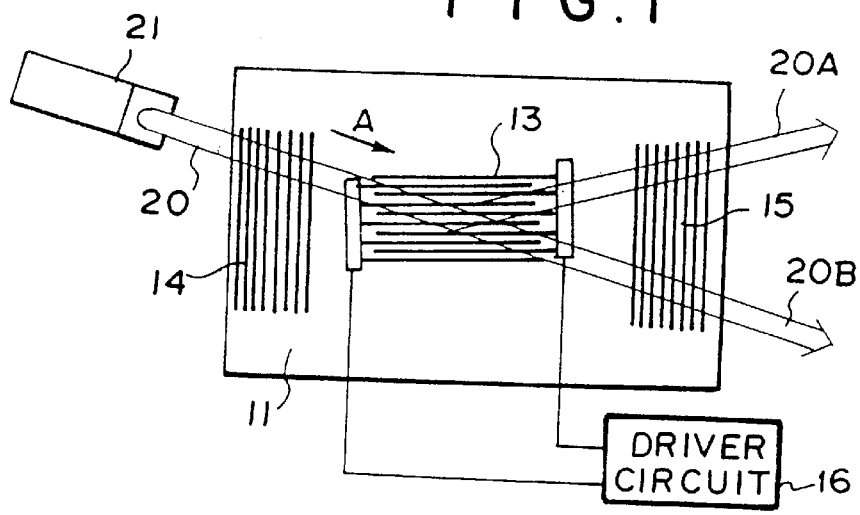
FIG. 1 is a plan view showing a first embodiment of an electro-optical waveguide element according to the present invention.
Figure 2:
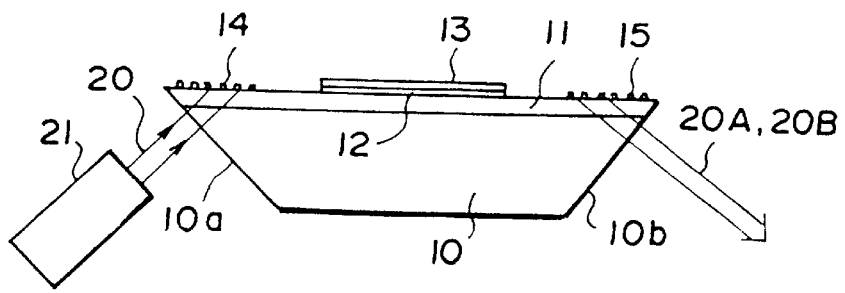
FIG. 2 is a side view of the first embodiment of the electro-optical waveguide element.

FIGS. 1 and 2 are respectively the plan and side views of an electro-optical waveguide element according to a first embodiment of the present invention. This electro-optical waveguide element is constructed as an optical modulator, and this element is provided with a thin-film optical waveguide 11 formed on an $LiNbO_3$ substrate 10 which is doped with MgO, a buffer layer 12 which is made of an $HfO_2$ film and formed on the thin-film optical waveguide 11, an EOG electrode 13 formed on this buffer layer 12, linear grating couplers (hereinafter referred to as LGC) 14 for light input and LGCs 15 for light output formed on the surface of the optical waveguide 11 in such a way that they face each other while being spaced apart from each other with the EOG electrode 13 interposed between them, and a driver circuit 16 for applying a predetermined voltage to the EOG electrode 13.

The method for manufacturing the chief elements of this type of electro-optical waveguide element is as follows. The X-cut-LiNbO$_3$ (X substrate) doped with MgO is submerged in a pyrophosphoric acid, and the substrate is subjected to proton exchange. The substrate is further subjected to an annealing treatment at temperatures of 300°–400° C. for one hour in the atmosphere, whereby the optical waveguide 11 is formed. In this case, the optical waveguide 11, in which a transmission mode of the guided light becomes a single mode with respect to light having a wavelength in the range of 400–800 nm, was obtained.

Figure 3:
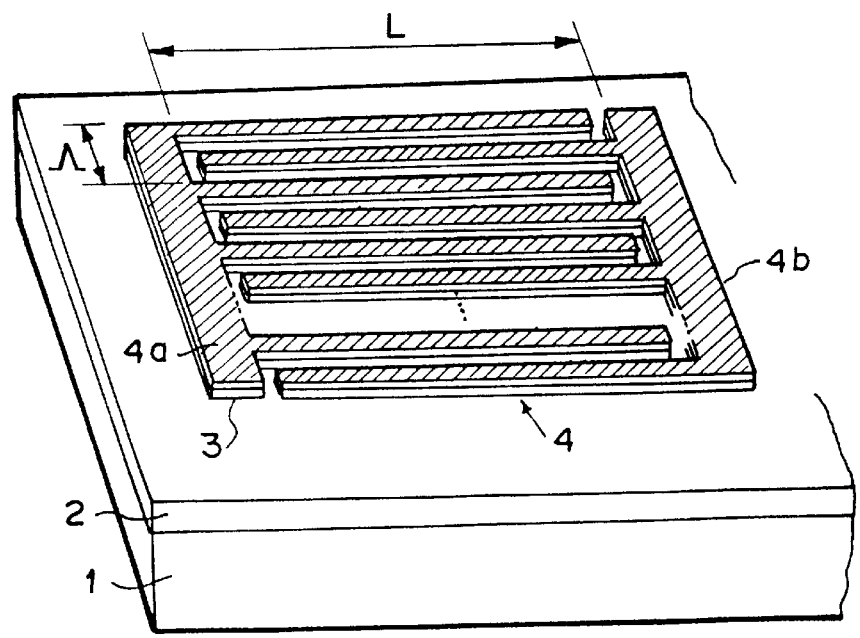
FIG. 3 is a perspective view showing one example of electrode used in this invention.
Figure 4:
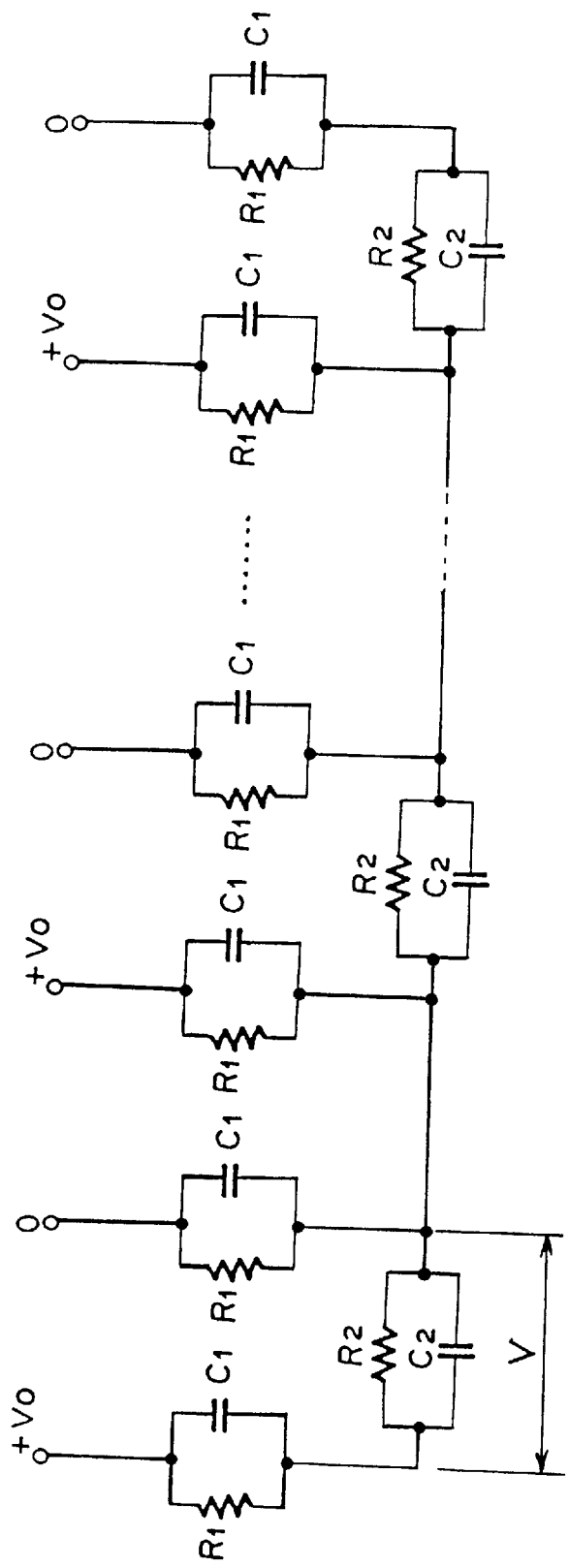
FIG. 4 is a circuit diagram showing an equivalent circuit of the structure shown in FIG. 3.

A resist pattern of the EOG electrodes is formed on the optical waveguide 11 by photolithography. Like the electrodes 4 shown in FIG. 3, the electrodes are arranged in a staggered pattern, and the period Λ of the electrodes is 6.9 $\mu$m.

Thereafter, HfO$_2$, which will comprise the buffer layer 12, is formed on the electrode pattern by a sputtering method. The sputtering is carried out using metal Hf as a target in an atmosphere consisting of a mixture of Ar gas and O$_2$ gas. A ratio of the total pressure to a partial pressure of O$_2$ gas was set to 30–95%, the pressure of the mixed gas was set to 10–50 mTorr, and the temperature of the substrate was set to 150° C. At this time, the rate of the formation of the HfO$_2$ film was 1–5 nm/min., and the time taken to carry out sputtering was controlled so that the thickness of the HfO$_2$ film would be thinner than the resist pattern, i.e., 200–300 nm.

After the HfO$_2$ had been formed, Al which acts as material for the electrodes was deposited over the HfO$_2$ film, and the resist was lifted off. As a result of this, the EOG electrode 13 is obtained. In this case, the buffer layer 12 is separated in correspondence with each part of the electrode.

The operation of the electro-optical waveguide element will now be explained. A laser light source 21, such as a He—Ne laser, for emanating a light beam 20 to be modulated is arranged in such a way that the light beam 20, which is a parallel ray, passes through an obliquely cut end face 10$a$ of the substrate 10, travels through the optical waveguide 11, and then enters the LGC 14. The light beam 20 enters the optical waveguide 11 after having been diffracted by the LGC 14 and advances through the optical waveguide 11 in the direction of an arrow A in a guide mode.

The light beam (guided light) 20 travels a part of the optical waveguide that corresponds to the EOG electrode 13. While no voltage is applied to the EOG electrode 13, the light beam 20 advances straight forwardly. Contrary to this, upon application of a predetermined voltage from a driver circuit 16 to the EOG electrode 13, the refractive index of the optical waveguide 11 having electro-optical effects is changed, as a result of which diffraction gratings are formed in the optical waveguide 11. The guided light 20 is diffracted by means of the diffraction gratings. Thus, the diffracted light beam 20A and the non-diffracted light beam 20B are diffracted by the LGC 15 toward the substrate 10, and they leave the optical device to the outside from an obliquely cut end face 10$b$ of the substrate 10.

If the light beam 20A emitted to the outside of the device, for example, is used, it will be possible to modulate the light beam 20A in response to the presence or absence of the application of the voltage from the driver circuit 16. For example, if the light beam 20A is modulated on the basis of a predetermined image signal, all that is needed is to control the application of the voltage from the driver circuit 16 on the basis of the image signal.

The DC drift developing in the electro-optical waveguide element of this embodiment will now be explained. To observe d.c. drift, the light beam 20 at a wavelength of 514.5 nm was introduced into the optical waveguide 11, and a constant voltage V$_0$ was applied to the EOG electrode 13 for eight minutes. The optical intensity of the light beam 20A which was diffracted at that time was continuously measured. The applied voltage V$_0$ was set to half of a voltage V$\pi$ required to obtain the maximum quantity of diffracted light.

The period Λ between electrodes of the EOG electrode 13 of the electro-optical waveguide element used in this experiment was set to 6.9 $\mu$m, and the thickness of the buffer layer 12 was set to 200 nm. An MIM capacitor was manufactured using HfO$_2$ which is a material for the buffer layer 12 of this embodiment. An A.C. voltage having an amplitude of 500 mV and a frequency of 100 kHz was applied to the MIM capacitor, and an impedance thereof was measured at that time. Thus, the capacitance of the capacitor was obtained. Upon conversion of the capacitance to a dielectric constant, the dielectric constant was found to be 30. Moreover, the resistivity of the buffer layer 12 was 1×10$^8$–1×10$^{10}$ Ωcm, and the resistivity of the optical waveguide 11 was 1×10$^8$–1×10$^{10}$ Ωcm.

Figure 6A:
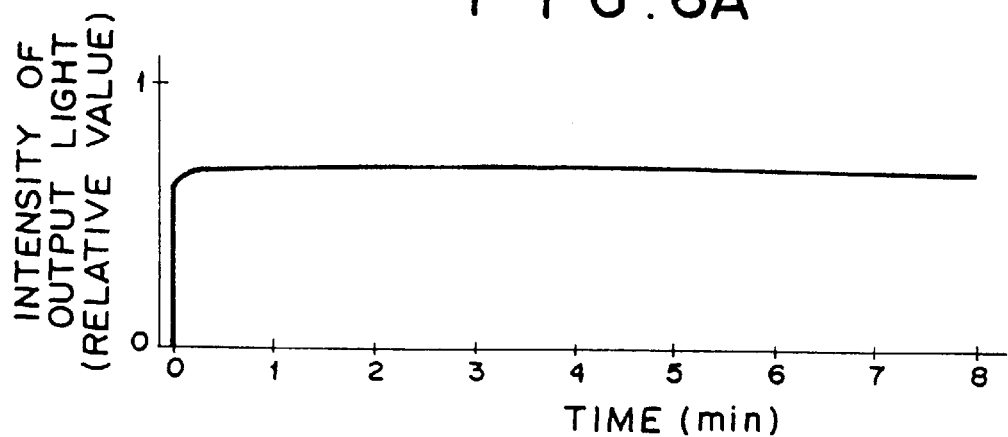
FIGS. 6A, 6B and 6C are graphs showing the results obtained when the amount of d.c. drift of the first embodiment of the electro-optical waveguide element is measured.
Figure 6B:
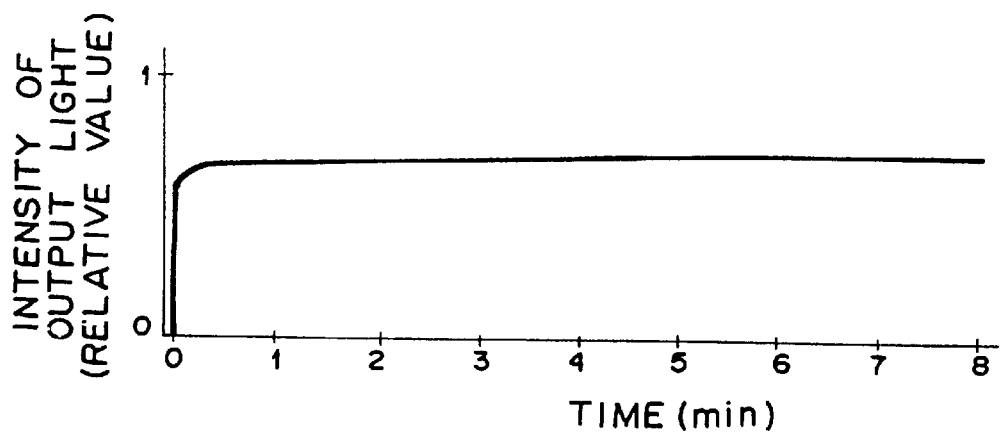
Figure 6C:
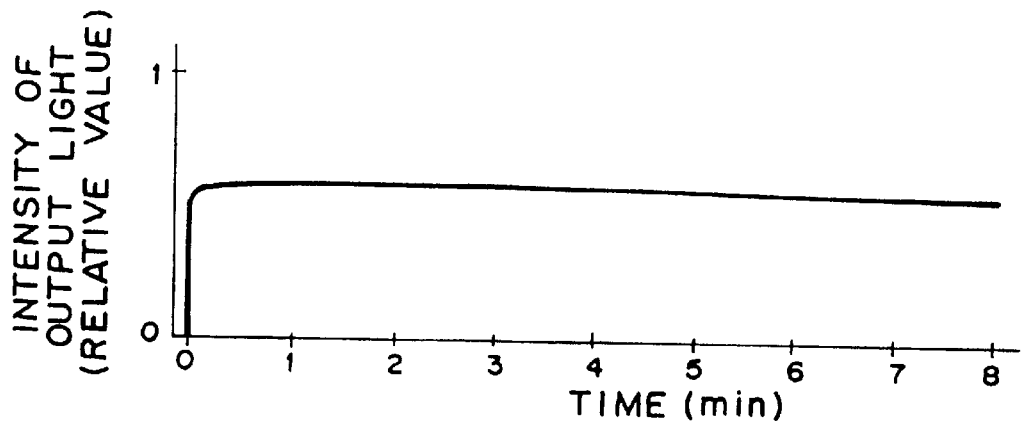

The results obtained by measuring the optical intensity of the light beam 20A are shown in FIGS. 6A, 6B and 6C. FIGS. 6A, 6B, and 6C respectively show the measured result of the optical intensity for each of the cases where the power densities of guided light are 5 W/cm$^2$, 0.5 W/cm$^2$ and 0.05 W/cm$^2$. Although the optical intensity is shown as a relative value, the value one represents the maximum light output of the optical modulator (that is, the optical intensity is normalized by the maximum light output of the optical modulator). This value is common to FIGS. 6A, 6B and 6C, and FIGS. 7A, 7B and 7C. As shown in FIGS. 6A, 6B and 6C, the optical intensity of the diffracted light beam 20A is maintained substantially constant for eight minutes both when the power density of the guided light is low and when the same is fairy high, such as 5 W/cm$^2$. Thus, noticeable DC drift did not occur.

An electro-optical waveguide element, whose buffer layer is formed of SiO$_2$ in the same manner as a conventional electro-optical waveguide element, will be explained as a comparative example with respect to the present embodiment. When compared with the electro-optical waveguide element shown in FIGS. 1 and 2, the electro-optical waveguide element of this comparative example is basically different from the electro-optical waveguide element shown in FIGS. 1 and 2 in the material used for the buffer layer. Reference numerals used in FIGS. 1 and 2 will be suitably quoted in the following explanation.

The method for manufacturing the waveguide element of the comparative example is the same as that used in manufacturing the waveguide element of the previous embodiment up to the step of forming a resist pattern on the EOG electrode. Further, the shape of the electrode is also the same as that of the previous embodiment.

After a resist pattern of the EOG electrode has been formed, SiO$_2$ which will comprise the buffer layer 12 is formed on the electrode pattern using the sputtering method. The sputtering was carried out using a sintered body of SiO$_2$ as a target in the atmosphere consisting of a mixture of Ar gas and O$_2$ gas. A ratio of a total pressure to a partial pressure was set to 10%, and the pressure of the mixed gas was set to 5 mTorr, and the temperature of the substrate was set to 150° C. At this time, the rate of the formation of the film was 10 nm/min., and the time taken to carry out sputtering was controlled so that the thickness of the $SiO_2$ film which acts as a buffer layer would be thinner than that of the resist pattern, i.e. 100–200 nm.

After the formation of the $SiO_2$ film, Al which is material for the electrode was deposited on the $SiO_2$ film. The Al was then lifted off, so that the EOG electrode 13 was obtained.

DC drift developing in the electro-optical waveguide element of the comparative example will be explained. DC drift was observed in the same manner as in the first embodiment. Even in this case, the period $\Lambda$ of the electrodes of the EOG electrode 13 was set to 6.9 $\mu$m, and the thickness of the buffer layer 12 was 100 nm.

The MIM capacitor was made of $SiO_2$, and the capacitance thereof measured on 100 kHz was converted into a specific value. In this way, the dielectric constant of $SiO_2$, which is the material used for the buffer layer 12 of the comparative example, was found to be four. The resistivity of the buffer layer 12 was $1\times10^{12}$–$1\times10^{15}$ $\Omega$cm, and the resistivity of the optical waveguide 11 was $1\times10^8$–$1\times10^{10}$ $\Omega$cm.

Figure 7A:
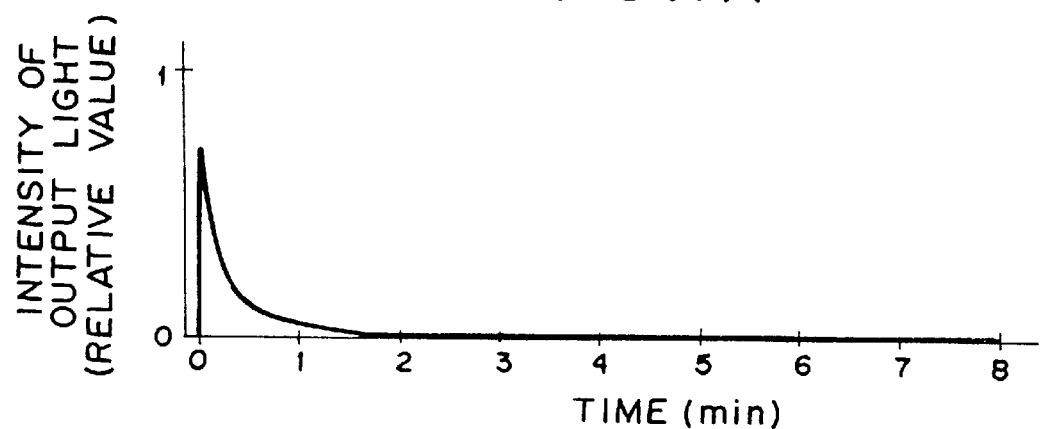
FIGS. 7A, 7B and 7C are graphs showing the results obtained when the amount of DC drift of a comparative example of the electro-optical element relative to the present invention is measured.
Figure 7B:
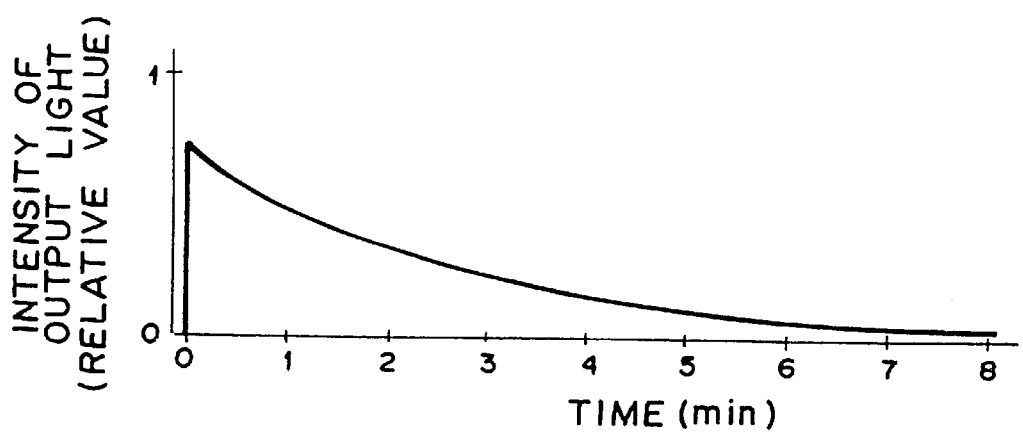
Figure 7C:
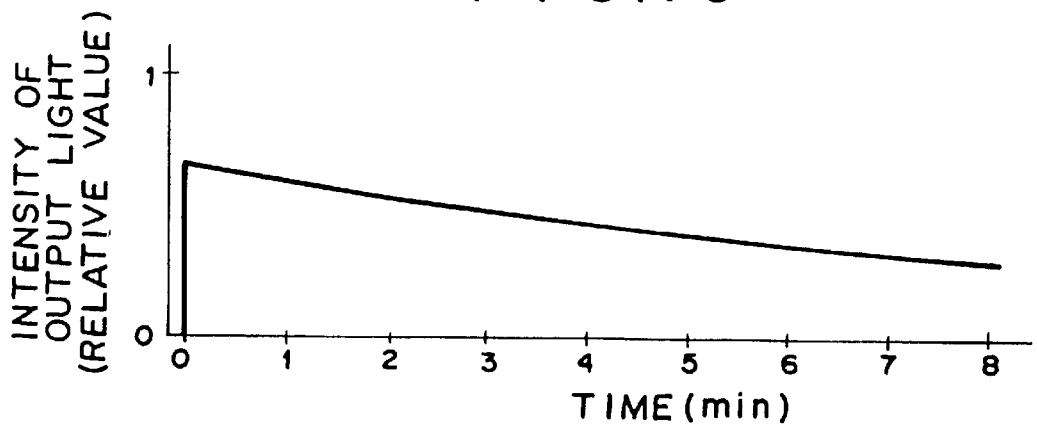

The results obtained by measuring the optical intensity of the diffracted light beam 20A are shown in FIGS. 7A, 7B, and 7C. FIGS. 7A, 7B, and 7C respectively show the measured result of the optical intensity for each of the cases where the power densities of the guided light are 5 W/cm$^2$, 0.5 W/cm$^2$, and 0.05 W/cm$^2$. As shown in the drawings, in this comparative example, the optical intensity of the diffracted light is gradually decreased as time elapses since the initiation of the application of the voltage. It can be seen that noticeable d.c. drift phenomena occurred. Particularly, when the power density of the guided light is as large as 5 W/cm$^2$, the tendency of the occurrence of the DC drift is remarkable.

As a result of the comparison of the measured results shown in FIG. 6 with those shown in FIG. 7, it can be seen that the evident D.C drift reducing effect was obtained by means of the present invention.

Second Embodiment

Figure 8:
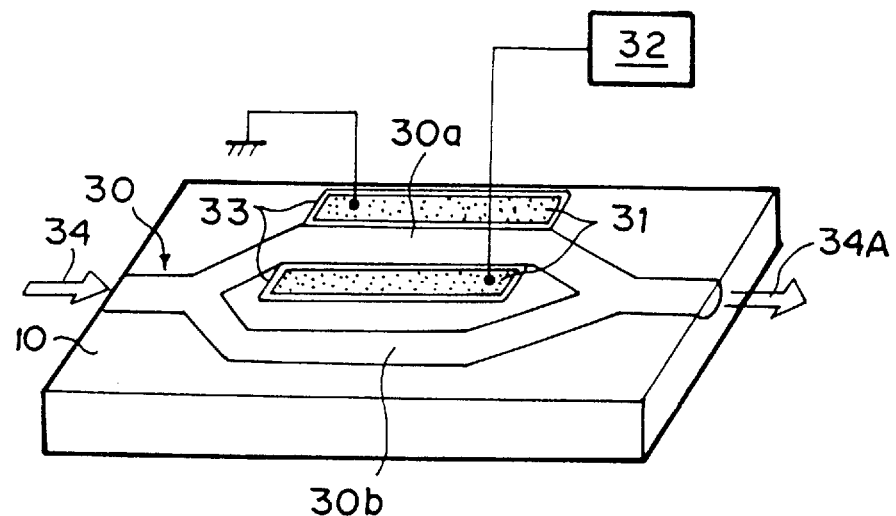
FIG. 8 is a perspective view showing a second embodiment of an electro-optical waveguide element according to the present invention.

An electro-optical waveguide element according to a second embodiment of the present invention will be described by reference to FIG. 8. The electro-optical waveguide element is provided with the LiNbO$_3$ substrate 10 doped with MgO, an optical channel waveguide (so-called Mach-Zehnder Modulator) 30, formed on the substrate 10, which looks like two Y-shaped branch optical waveguides connected together, a pair of planar electrodes 31, 31 formed on the substrate 10 so as to sandwich one branch portion 30a of the optical channel waveguide 30 between them, and a driver circuit 32 for applying a predetermined voltage to the planar electrodes 31, 31. Even in this case, a buffer layer 33 consisting of an HfO$_2$ film is sandwiched between the substrate 10 and each of the planar electrodes 31, 31.

In the electro-optical waveguide element having the previously mentioned structure, input light 34 enters the optical channel waveguide 30 from the left end thereof shown in the drawing, and the light is bifurcated into two lights by the first Y-shaped branch. The lights travel through the branch portions 30a and 30b and are recombined by the second Y-shaped branch. The light thus combined is emitted as output light 34A from the right end of the optical channel waveguide 30 in the drawing.

Upon application of a predetermined voltage to the branch portion 30a of the waveguide 30 via the electrodes 31, 31, the refractive index of the branch portion 30a is varied, and hence the phase of light traveling through the branch portion 30a is modulated in response to the presence or absence of the application of the voltage. The light traveled through the branch portion 30a and the light traveled through the branch portion 30b interfere with each other when they are recombined. Accordingly, the intensity of the output light 34A is modulated in response to the presence or absence of the application of the voltage.

As with the first embodiment, even in the electro-optical waveguide element according to the second embodiment, the DC drift reducing effect is obtained because the buffer layer 33 is formed of the HfO$_2$ film having a dielectric constant of as large as 30.

Third Embodiment

Figure 9:
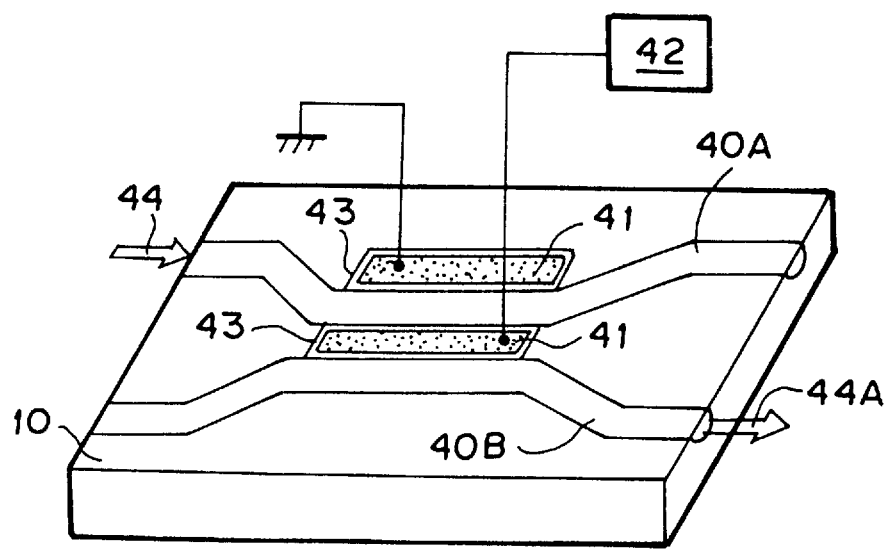
FIG. 9 is a perspective view showing a third embodiment of an electro-optical waveguide element according to the present invention.

With reference to FIG. 9, an electro-optical waveguide element according to a third embodiment of the present invention will now be described. The waveguide element of this embodiment is provided with the LiNbO$_3$ substrate 10 doped with MgO, two optical channel waveguides 40A, 40B, formed on the substrate 10, which constitute a directional coupler, a pair of planar electrodes 41, 41 formed on the substrate 10 so as to sandwich the optical channel waveguide 40A, and a driver circuit 42 for applying a predetermined voltage to the planar electrodes 41, 41. Even in this case, a buffer layer 43 consisting of the HfO$_2$ film is sandwiched between the substrate 10 and each of the planar electrodes 41.

In the electro-optical waveguide element having the above mentioned structure, input light 44 is introduced into the optical channel waveguide 40A, and the light travels through it. The light then leaks into the other channel waveguide 40B at an area where the channel waveguides 40A and 40B are close to each other. The leaked light travels through the channel waveguide 40B and is emitted from the waveguide 40B as output light 44A.

Upon application of a predetermined voltage to the channel waveguide 40A via the electrodes 41, 41, the refractive index of the channel waveguide 40A is changed, and hence the magnitude of the leakage of the guided light from the channel waveguide 40A to the channel waveguide 40B is also changed. Therefore, the intensity of the output light 44A is modulated in response to the presence or absence of the application of the voltage.

As with the first and second embodiments, even in the electro-optical waveguide element of the third embodiment, the buffer layer 43 is formed of the HfO$_2$ having a dielectric constant of as large as 30, and a DC drift reducing effect is obtained.

The present invention is not limited to the optical waveguide manufactured by the proton exchange and the annealing treatment as previously mentioned, and it is applicable to electro-optical waveguide elements having other proton-exchanged optical waveguides and Ti-diffused optical waveguides. Even in these cases, similar effects will be obtained.

The material used for forming the buffer layer of the present invention is not limited to HfO$_2$ used in each of the previous embodiments. Other materials, for example, TiO$_2$, SrTiO$_3$, BaTiO$_3$, LiNbO$_3$, LiTaO$_3$, Pb(Zr, Ti)O$_3$, (Pb, La)(Zr, Ti)O$_3$ can be also used as the material of the buffer layer.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to those who are versed in the art.

What is claimed is:

1. An electro-optical waveguide element comprising:

an optical waveguide formed on a substrate having electro-optical effect;

at least a pair of electrodes attached to the vicinity of the optical waveguide via a buffer layer, said buffer layer consisting of $HfO_2$;

linear grating couplers for input light and linear grating couplers for output light being arranged on said optical waveguide with said pair of electrodes interposed therebetween;

a driver circuit for applying a voltage between the electrodes wherein the buffer layer is made of a material having a dielectric constant in the range of 20–1000.

2. An electro-optical waveguide element comprising:

an optical waveguide formed on a substrate having electrooptical effects;

at least a pair of electrodes attached to the vicinity of the optical waveguide via a buffer layer sandwiched between the substrate and the electrodes;

a driver circuit for applying a voltage between the electrodes, wherein the material of the buffer layer consists of $HfO_2$ wherein the buffer layer is made of a material having a dielectric constant in the range of 20–1000.

* * * * *